United States Patent [19]
Bradley

[11] 3,992,946
[45] Nov. 23, 1976

[54] HYDRAULIC WEIGHING APPARATUS

[75] Inventor: Chester D. Bradley, Darien, Conn.

[73] Assignee: The A. H. Emery Company, New Canaan, Conn.

[22] Filed: Dec. 11, 1975

[21] Appl. No.: 639,841

[52] U.S. Cl. .............................. 73/407 R; 92/98 D; 177/209
[51] Int. Cl.² .......................................... G01L 7/08
[58] Field of Search .................. 73/1 B, 141 R, 406, 73/407, 419; 177/209, 208; 92/98 D

[56] References Cited
UNITED STATES PATENTS

| | | | |
|---|---|---|---|
| 3,254,573 | 6/1966 | Prell | 73/406 |
| 3,338,323 | 8/1967 | Swersey | 177/209 |

FOREIGN PATENTS OR APPLICATIONS

| | | |
|---|---|---|
| 132,288 | 9/1919 | United Kingdom |

*Primary Examiner*—S. Clement Swisher
*Attorney, Agent, or Firm*—St. Onge Mayers Steward & Reens

[57] ABSTRACT

A weighing apparatus comprises a plurality of hydraulic load cells each including a piston, a cylinder, and a flexible diaphragm of fluid impervious material sealed in the cylinder and overlying the piston to form a fluid pressure receiving chamber. The cylinders are interconnected in spaced coaxial relation on a main support frame. The pistons are similarly mounted on a floating frame which comprises a number of threaded rods which permits reciprocal piston movement relative to the cylinder and to the main frame. A force sensitive output signal generator is mounted in the main frame in operative relation to the interconnected pistons to receive forces from them when fluid pressure is received in any of the pressure receiving chambers. The pistons are adjustably clamped to the threaded by nuts so that the piston-cylinder spacing may be changed for calibration purposes. Accordingly, the amount of force exerted by any one piston on the output signal generator may be varied independently of the force exerted by any other piston. The cylinder of each load cell is formed with an undercut portion to permit the inner cylindrical wall to flex in the radial direction in response to fluid pressure received in the pressure receiving chamber to permit flexing which compensates for non-linearity of output response due to difference in acting area of the diaphragm at different relative positions of the piston and cylinder.

10 Claims, 5 Drawing Figures

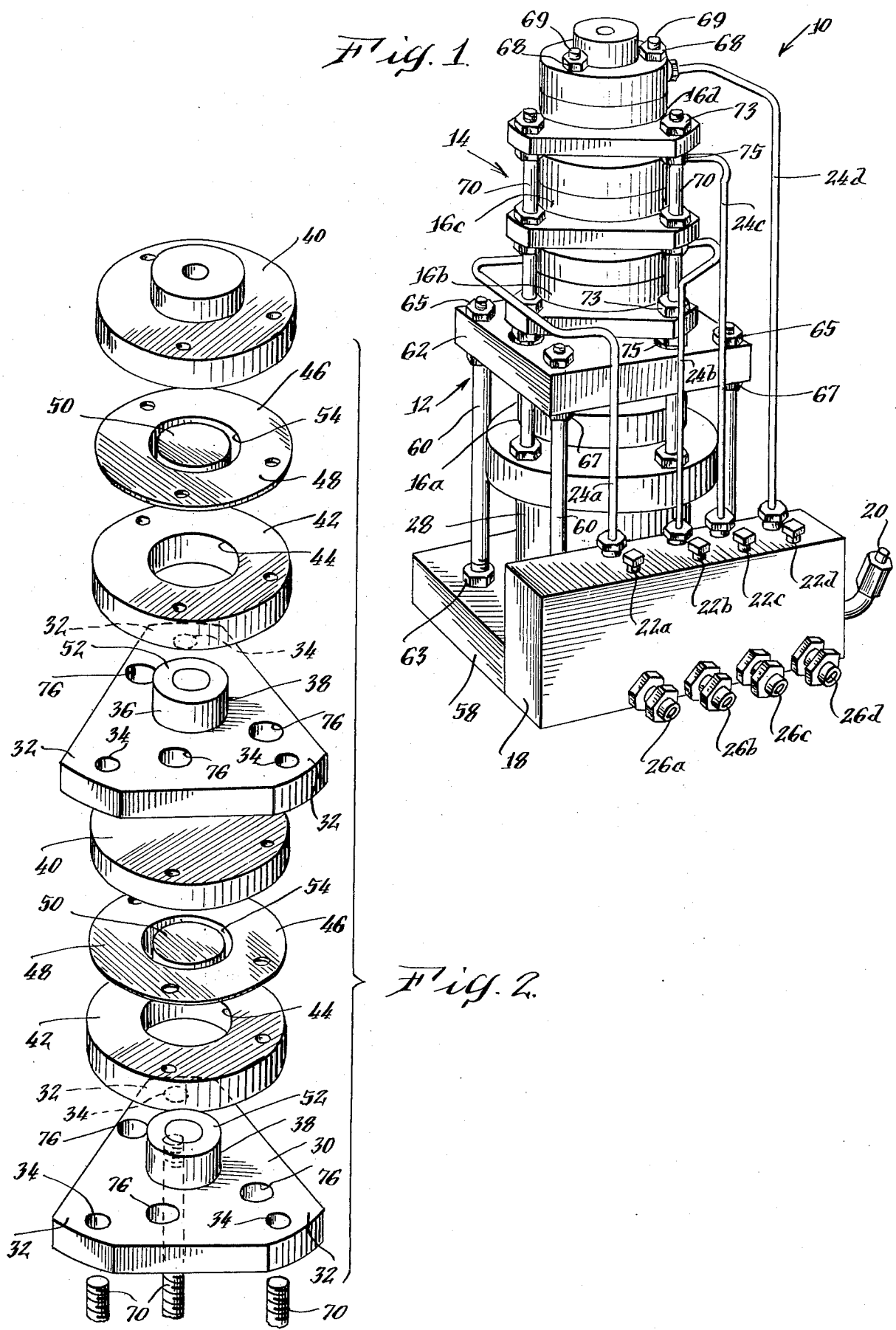

HYDRAULIC WEIGHING APPARATUS

BACKGROUND OF THE INVENTION

1. Field of the Invention

The present invention relates to an easily calibrated weighing apparatus which combines the output pressures of a plurality of hydraulic load accepting cells and produces one output signal that is proportional to the sum of those output pressures. The output signal of the weighing apparatus is also substantially linearly related to the sum of the load accepting cell output pressures.

Weighing apparatus of this type are called "totalizers", and are commonly used in conjunction with a platform weighing device that includes a foundation, a platform, and a number of hydraulic load accepting cells interposed between the foundation and platform. Each of the load accepting cells is hydraulicly coupled to the totalizer where the fluid output pressures of all of the load accepting cells are summed and a single output signal, proportional to the sum, is generated. In this way, the totalizer compensates for variation in the output pressure from any of the individual load accepting cells which might result from unequal distribution of the load on the platform.

2. Description of the Prior Art

Load totalizer weighing apparatus of the kind briefly described above are presently known. For example, U.S. Pat. No. 2,093,141 (Sonsalla) discloses a device having a plurality of hydraulic cells, arranged vertically above one another, each comprisng an oil pressure chamber, a chamber enclosing diaphragm and a piston associated with the diaphragm. Each of the pistons is connected through a transmission plate to the piston of a single manometer which yields an output signal.

U.S. Pat. No. 2,125,483 (Blanchard) discloses a similar arrangement of vertically assembled hydraulic cells which yields a single output by combining the outputs from a number of individual load accepting cells.

Bulletin 760 entitled "Instruction Manual for EMERY Load Totalizer with Voltage Output" (1970), published by The A. H. Emery Company, the assignee of the present invention, discloses a weighing apparatus also having a vertical assembly of load totalizer cells, each of which is hydraulically coupled to a load accepting cell. Each totalizer cell comprises a cylinder and a piston. The cylinders of the respective totalizer cells are interconnected in spaced coaxial relation on a fixed main frame, and the associated pistons are interconnected in spaced coaxial relation on a floating frame. A flexible diaphragm is sealed in each cylinder and overlies the associated piston to define a fluid pressure receiving chamber, and an annular diaphragm fold interlies the free space between the side walls of each piston and cylinder. The interconnected pistons are mechanically linked to an electric load cell which yields a single electrical output signal proportional to the total of the output pressures received by the totalizer cells from the load accepting cells.

Each of the devices described above have certain drawbacks. Generally, it is difficult to calibrate the totalizer to yield the same output when each hydraulic load accepting cell is independently loaded with equivalent weight. That is, it is difficult to calibrate the weighing system comprising the platform weighing device and the totalizer to yield an equivalent output when each load accepting cell is independently loaded. Ordinarily calibration requires adjustment of the load accepting cells. Such a calibration process can be time consuming, complex and expensive since the platform weighing device may have to be dismantled to gain access to the individual load accepting cells. Because the totalizer apparatus is self-contained and is usually more accessible than the load accepting cells, it is therefore preferable to calibrate the system at the totalizer.

Moreover, hydraulic load totalizers can exhibit non-linear output response which results from variation in the acting area of the diaphragms at different relative positions of the piston and cylinder.

SUMMARY OF THE INVENTION

In a preferred embodiment to be described below in detail, the weighing apparatus of the present invention is a hydraulic load totalizer which may be used in conjunction with a platform weighing device or with any other hydraulic weighing device which incorporates two or more hydraulic load cells. This totalizer combines the output pressures of each of the hydraulic load accepting cells in the weighing device and produces a single output signal that is proportional to the sum of the individual load accepting cell output pressures. This totalizer may be easily calibrated to yield the same output response when each of the load accepting cells is loaded with a given weight. Further, the totalizer incorporates a feature which makes its output response substantially linear regardless of the amount of weight received by the platform weighing device.

In its preferred embodiment, this hydraulic load totalizer comprises a plurality of totalizer cells, each of which includes a piston and a cooperating cylinder which is formed of a pressure block and a cylindrical collar fixed to the pressure block. The cylinder, which is open at one end, receives the piston in freely interfittable, relatively reciprocally movable relation. A flexible diaphragm of a fluid impervious material is sealed between the pressure block and collar and overlies the piston to form a liquid pressure receiving chamber therebetween. An annular fold of the diaphragm interlies a portion of the free space between the collar and piston.

The totalizer load cell cylinders are mounted in spaced coaxial relation on a fixed frame. Further, the totalizer cell pistons are interconnected in spaced coaxial relation on a plurality of threaded rods which comprise a floating frame. The location of each piston is fixed relative to the rods by a number of pairs of clamp nuts which are threaded onto each rod to clamp the piston therebetween. These nuts are rotatable to adjustably move the piston on the rod in a direction substantially parallel to the piston axis.

An electric load cell or other force sensitive output signal generator is mounted in the main frame in operative relation to the interconnected pistons for receiving force therefrom when fluid pressure is developed in any of the totalizer cell pressure receiving chambers.

The totalizer may be calibrated by individually adjusting the axial location of each piston relative to its cylinder through rotation of the clamp nuts when a given pressure is developed in the cell's pressure receiving chamber by a given load applied over the corresponding load accepting cell in the platform. This axial location adjustment varies the acting area of the diaphragm associated with the individual totalizer cell being calibrated and thereby varies the amount of force applied to the output signal generator by the cell's piston. Variations of totalizer output produced by the same load being applied in turn over each of the platform load accepting cells may be compensated for by successively adjusting the remaining totalizer cells in this manner. Consequently, calibration of the entire system may be achieved conveniently and easily at one centralized location, namely at the totalizer, by adjusting appropriate components, namely the clamp nuts, which are easily accessible.

The load totalizer of the invention further incorporates a feature which automatically compensates for the variation of acting area of the flexible diaphragm which ordinarily occurs at different relative positions of the pistons and cylinders in response to varying pressures. Thus, the totalizer produces a linear output response. In particular, the collar member is provided with an undercut portion that underlies the inner cylindrical wall thereof to permit the wall to flex in a radial direction in response to fluid pressure developed in the pressure receiving chamber and in the annular fold of the diaphragm. The undercut is shaped and sized so that the wall flexes to a degree sufficient to maintain the acting area of the diaphragm substantially constant and, hence, to yield substantially linear totalizer output response.

Accordingly, it is an object of the present invention to provide a hydraulic weighing apparatus in the form of an easily calibrated totalizer which combines the output pressures of a number of independent hydraulic load accepting cells and yields an output signal proportional to the sum of these load accepting cell output pressures. Further, the output of this load totalizer is substantially linearly related to the sum of the load accepting cell output pressures.

Other objects, aspects, and advantages of the present invention will be pointed out in or will be understood from the following detailed description provided below in conjunction with the accompanying drawings.

BRIEF DESCRIPTION OF THE DRAWINGS

FIG. 1 is a perspective view of the hydraulic load totalizer of the present invention.

FIG. 2 is an exploded perspective view of the two uppermost hydraulic load totalizer cells showing their internal components in detail.

DETAILED DESCRIPTION OF THE PREFERRED EMBODIMENTS

FIG. 1 illustrates the weighing device of the present invention in the form of a hydraulic load totalizer 10 for producing one output signal that is proportional to the sum of the individual output pressures of four load accepting cells which comprise, for example, a platform weighing device (not shown). Each load accepting cell may be of the type disclosed in U.S. Pat. No. 3,089,518 (Bradley). Further, each totalizer cell operates in conjunction with one load acccepting cell. It will be appreciated however, that the present invention may be adapted for use with weighing devices having more or less than four load accepting cells by providing a complimentary number of totalizer cells.

Figure 3:
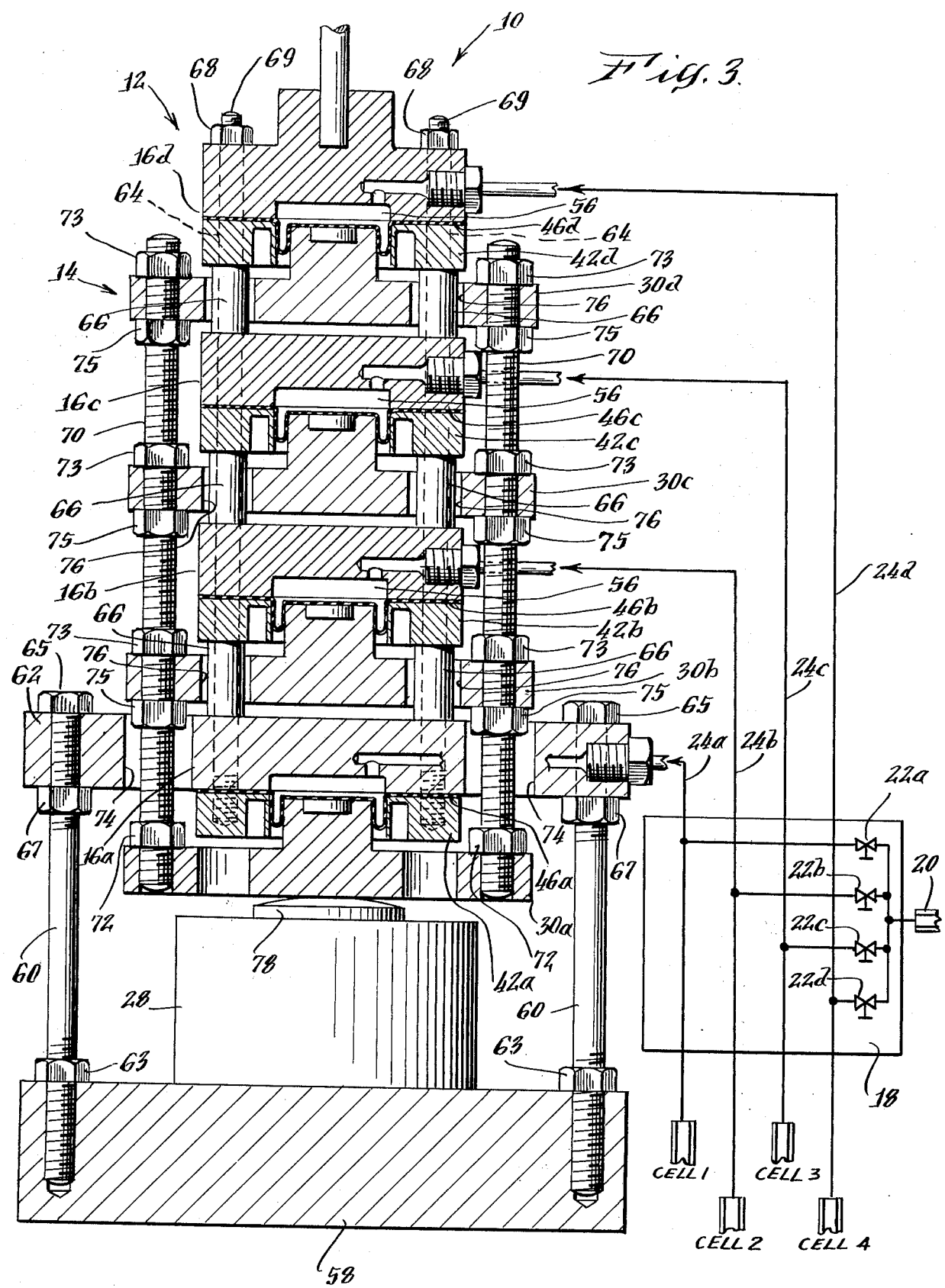
FIG. 3 is a vertical cross-sectional view of the hydraulic load totalizer taken through discontinuous plane 3—3 in FIG. 1.

The totalizer 10 includes an exposed main frame 12 and floating frame 14 which cooperate to support four hydraulic totalizer cells 16a through 16d in vertical, coaxially spaced relation as will be explained in greater detail below. A hydraulic fluid terminal block 18 is mounted with the main frame 12 and includes an internal network of fluid conduits (FIG. 3) for both filling each of the hydraulic load totalizer cells 16 and for connecting these cells to hydraulic load accepting cells in the platform weighing device. A hydraulic fluid filling coupling 20 mounted with the terminal block, communicates by means of external fluid conduits 24a through 24d respectively with each totalizer cell 16a through 16d. Flow from the filling coupling 20 to each cell is controlled by independently operable filler valves 22a through 22d (FIG. 3). Further, four input couplings 26a through 26d are mounted on terminal block 18. Each is internally connected therein with one external fluid conduit 24a through 24d respectively. The output hydraulic conduit from one load accepting cell is connected to each input coupling to associate the totalizer with the weighing device.

Totalizer 10 also includes a force sensitive output signal generator in the form of an electric load cell 28 which is mounted in main frame 12 in operative relation to the lowermost totalizer cell 16a. However, this output signal generator may be an independent hydraulic load cell or any other type of device for generating an output pressure signal.

FIG. 2 illustrates in detail the construction of the two uppermost hydraulic load totalizer cells 16c and 16d which are generally representative of all of the cells 16. Each cell includes a generally triangular base 30 having three radially outwardly projecting ears 32. A mounting hole 34 is disposed through each ear. A fixed cylindrical input piston 36 having a side cylindrical wall 38 is formed integrally with base 30 to extend upwardly therefrom. However, any other suitable means of assembling piston 36 on base 30 may be employed. A cylinder assembly, which compliments piston 36, includes an upper pressure block 40 and cylindrical collar member 42 attached to the pressure block in a manner described below. This collar member has a cylindrical opening 44 formed to fit loosely over the piston 36 and permit free relatively reciprocal, axial movement between them.

A cup-shaped flexible diaphragm 46, which is preferably formed of a fluid impervious, pliable plastic material, includes a radially outwardly extending flange portion 48 that is clamped between the lower planar surface of pressure block 40 and the upper planar surface of collar member 42. In this way, the assembled block 40, diaphragm 46, and collar 42 form a movable cylinder which is cooperatively engageable by piston 36. The central portion 50 of diaphragm 46 is formed as a cylindrical cup-shaped depression depending from flange 48. When the cylinder assembly and piston are engaged, the central portion 50 overlies the plane upper surface 52 of piston 36 while an annular loop 54 of the flexible diaphragm, shown in FIG. 3, interlies between the side cylindrical wall 38 of piston 36 and the cylindrical opening 44 of collar member 42. In this manner, a substantially friction-free hydraulic seal between the piston and cylinder assembly is formed.

A suitable hydraulic fluid is injected into the pressure receiving chamber 56, shown in FIG. 3, defined between the upper surface of diaphragm 46 and the lower surface of pressure block 40, to support piston 36. Accordingly, when fluid pressure increases in this pressure receiving chamber, the piston is driven outwardly of the cylinder assembly. Conversely, when the fluid pressure in the receiving chamber decreases, the piston is withdrawn back into the cylinder assembly.

FIG. 3 illustrates the mode of mounting the respective components of each load totalizer cell 16 on the main and floating frames 12 and 14 in such a manner that fluid pressure received in each of the pressure receiving chambers of the respective load totalizer cells is added together to effect an output response by the force sensitive output signal generator 28. Specifically, the main frame comprises a base platform 58, four threaded standards 60 tapped into the base platform, and a square plate 62 which forms the pressure block of the lowermost totalizer load cell 16a. The standards 60 are locked against rotation in base platform 58 by lock nuts 63 and the square plate 62 is locked on the standards 60 by cooperating upper and lower lock nuts 65 and 67. Three elongate threaded rods 64 are tapped into collar member 42a of the lowermost totalizer load cell 16a and extend upwardly through the associated diaphragm 46a and the square plate. The threaded rods further pass through the three uppermost cell cylinder assemblies. Suitable cylindrical spacers 66 axially separate these assemblies on the rods. A cap nut 68 engaged on the exposed end 69 of each rod 64 clamps the respective pressure blocks, diaphragms and collar members together on the rods 64. Accordingly, the cylinder assemblies of all four totalizer load cells are fixed in spaced coaxial relation by the unitary main frame 12 which is, thus, comprised of the base platform 56, standards 60, square plate 62, threaded rods 64, and spacers 66 and nuts 68. The cylinder assemblies, too, become an integral part of the main frame.

The respective bases 30 with integrally formed pistons 36 of each of the load totalizer cells are similarly interconnected in the floating frame 14. This floating frame comprises three threaded rods 70 each of which has one end tapped into the base 30a of the lowermost totalizer cell 16a and locked thereto by a suitable clamp nut 72. Further, each of the threaded rods 70 extends upwardly from this first base 30a through the appropriate holes 34 in each of the respective load totalizer cell bases 30b through 30d. Similarly, a pair of upper and lower clamp nuts 73 and 75 respectively, is threaded onto each rod 70 for each of the three uppermost load totalizer cell bases to hold them at a fixed axial position thereon. As can be seen in FIG. 3, the square plate 62 of the main frame 12 is provided with three holes 74 which permit floating frame threaded rods 70 to pass freely therethrough. Similarly, each of the three uppermost load cell bases 30b through 30d, are provided with three holes 76 that permit the main frame threaded rods 64 and spacers 66 to pass therethrough. Accordingly, the floating frame can move freely upwardly and downwardly relative to the fixed frame. That is, all four input pistons may move in unison upwardly and downwardly relative to all four fixed cylinder assemblies.

The output signal generator 28 is mounted in the main frame in operative relation with the lowermost load totalizer cell base 30a. Specifically, signal generator 28 has a force sensitive pad 78 that is physically contacted by base 30a.

The totalizer 10 may also include a tare spring assembly (not shown) of springs mounted in tension between the fixed frame and floating frame to pull the latter upwardly. This tare spring assembly supports the weight of the floating frame and piston assemblies mounted on it, and may be used to remove some of the downward force on the floating frame when heavy tare weights are involved.

As shown diagrammatically in FIG. 3, each of the load totalizer cells is connected through the terminal block 18 to one load accepting cell. Fluid pressure from any of the load accepting cells conducted through the input conduits 24 effects a similar fluid pressure in the respective fluid pressure receiving chambers 56 which in turn effects a downward force on the respective piston 36. Similarly, fluid pressure is physically added together by the vertical coaxial arrangement of the load totalizer cells to produce a single output at the output signal generator 28.

The floating frame arrangement of threaded rods which carry rotatable clamp nuts to mount the respective piston assemblies thereon, provides a convenient means for calibrating the load totalizer without disturbing the platform weighing device in conjunction with which it is used. Calibration is accomplished by loading only a first load accepting cell with a known weight and thereby developing a given pressure in the corresponding totalizer cell pressure receiving chamber yielding a given output from the output signal generator 28. Subsequently, the weight is removed from this first load accepting cell and placed on a second. The totalizer cell piston hydraulically coupled to this second load accepting cell is then adjusted upwardly or downwardly relative to its cooperating cylinder assembly by rotating clamp nuts 73 and 75 on floating frame threaded rods 70. This adjustment varies the acting area of the diaphragm associated with the second totalizer cell to thereby vary the amount of force applied to the output signal generator 28 even though the given pressure received from the second load accepting cell remains unchanged. Upward or downward piston adjustment is continued until the output signal generator yields the same output as that registered when the known weight was placed on the first load accepting cell. In this way, output of the signal generator is equalized when the first two load accepting cells are independently loaded with the known weight.

The calibration procedure is then repeated for each of the remaining cells in the load totalizer until the known weight loaded individually on each of the load accepting cells produces the same output from the output signal generator.

It can be seen that this calibration procedure is simple and easily carried out without disturbing or dismantling the platform weighing device. The floating frame threaded rods and cooperating clamp nuts may have thread dimensions which are chosen so that given rotation of the clamp nuts produces a fixed variation in the output from the output signal generator 28. For example, these thread dimensions may be chosen so that one-sixth rotation of the nut produces 0.02% variation in the output. Consequently, this floating frame arrangement represents a substantial improvement over the prior art and simplifies operation of the total weighing system comprising the totalizer and, for example, a platform weighing device.

Figure 4:
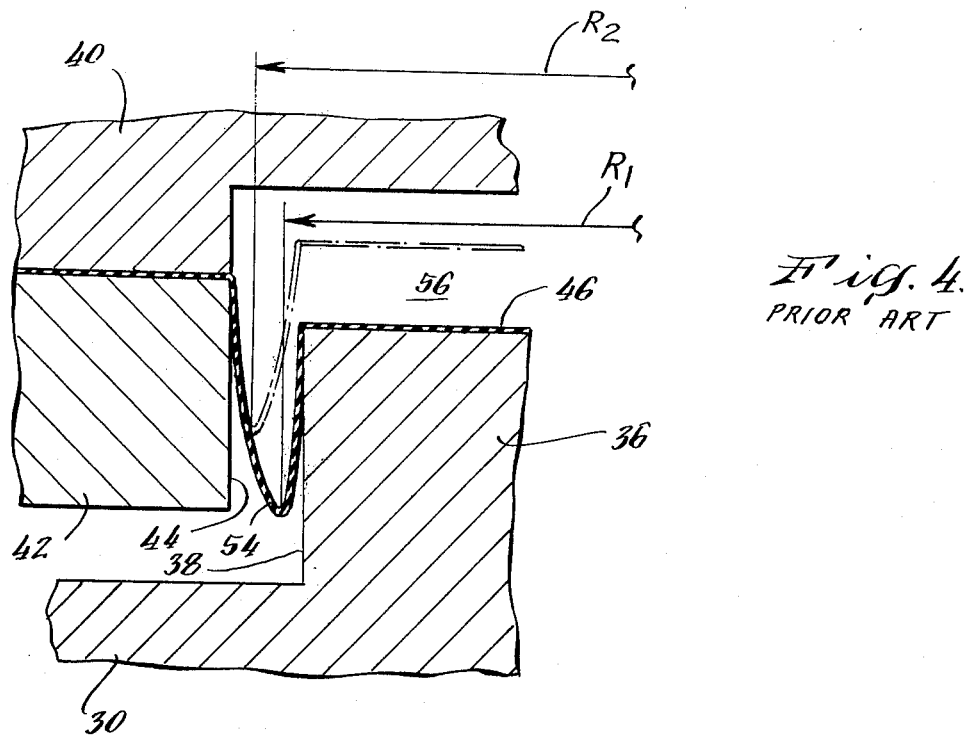
FIG. 4 is a diagrammatic illustration of a portion of a prior art cylinder, piston, and flexible diaphragm, showing in exaggerated form the change in acting area of the diaphragm at different relative positions of the piston and cylinders.

The apparatus of the present invention further includes a feature which corrects for non-linearity of output response often characteristic of prior art weighing devices such as rolling diaphragm hydraulic load cells similar to those described above. Non-linearity arises from change in the acting area of the flexible diaphragm at different relative positions of the piston and cylinder assembly which forms the load cell in response to varying pressures developed in the cell's pressure receiving chamber. This occurrence is illustrated in FIG. 4 diagrammatically. Solid lines show the relationship of the various components when the piston 36 is urged outwardly of the cylinder assembly by increasing fluid pressure in the pressure receiving chamber 56. Specifically, when the piston is so urged outwardly, the diaphragm 46 hangs in a curve between the collar cylindrical opening 44 and the side piston cylindrical wall 38 with the vertex of fold 54 closer to piston side cylindrical wall 38. Only the area of the diaphragm on the piston side of the fold vertex is acting since the diaphragm to the cylinder side of the vertex of the diaphragm is grounded or fixed to the cylinder. That is, in the position shown by solid lines in FIG. 4, the acting area $A_1$ of the piston and diaphragm is given by $A_1 = \pi R_1^2$. However, as shown by phantom lines in FIG. 4, when the piston returns upwardly into the cylinder assembly in response to decreasing pressure in the pressure receiving chamber, the diaphragm hangs in a curve with the vertex of fold 54 closer to the cylindrical opening 44 of collar 42. Accordingly, the acting area $A_2$ of the diaphragm increases and is given by $A_2 = \pi R_2^2$.

This variation in acting area of the diaphragm produces non-linear output response. A linear increase in fluid pressure in the pressure receiving chamber 56 acts on a decreasing piston area and hence produces a decreasing force on piston 36.

Figure 5:
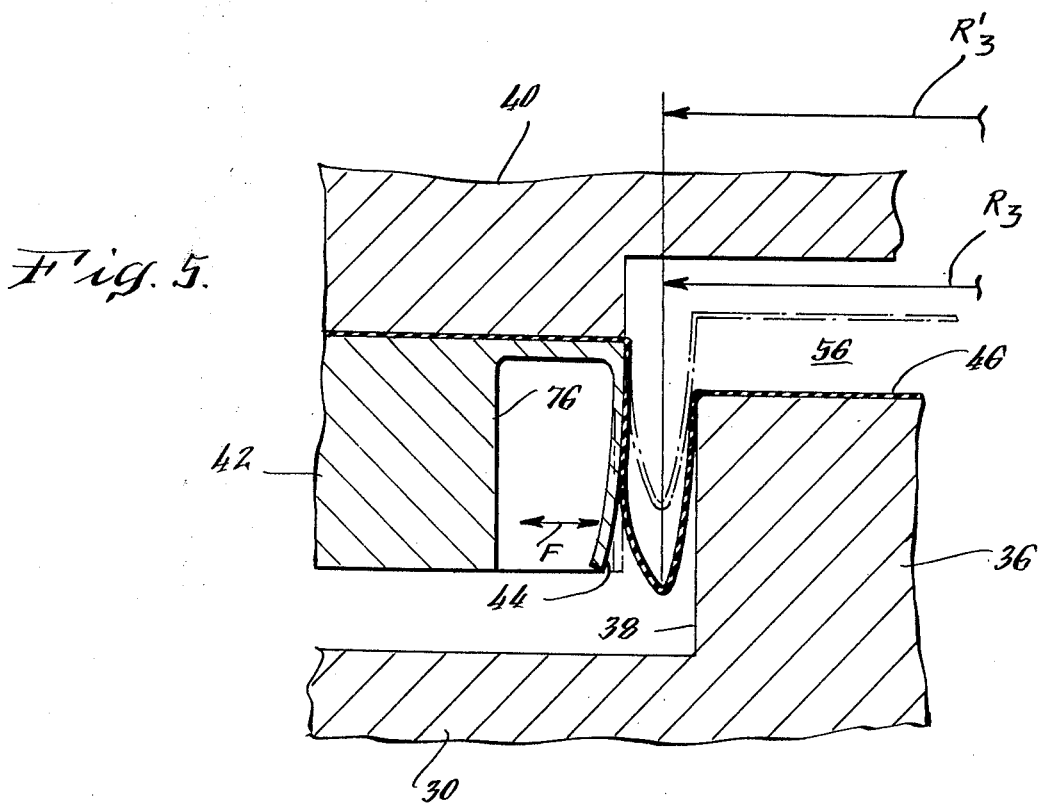
FIG. 5 is a partial diagrammatic illustration similar to that shown in FIG. 4 which shows the undercut portion of the collar member of each totalizer cell in weighing apparatus of the present invention. The operation of this feature to maintain the acting area of the flexible diaphragm substantially constant is illustrated.

As shown in FIG. 3 and explained in detail with reference to FIG. 5, each load totalizer cell of the present invention incorporates a collar 42 with an undercut portion 76 underlying the cylindrical opening 44. This undercut portion permits the cylindrical wall to flex in the radial direction indicated by arrow F. Accordingly, when piston 36 is urged outwardly of the cylinder assembly due to increased input pressure, pressure acting on the diaphragm in all directions equally causes the cylindrical collar wall to flex radially outwardly thereby shifting the vertex of fold 54 outwardly. Conversely, when pressure is reduced, the piston returns upwardly into the cylinder assembly, the side cylindrical wall flexes radially inwardly under the influence of its own elasticity to cause the vertex of fold 54 to move radially inwardly. The dimensions of the undercut are fixed so that the flex of the side cylindrical wall of collar member 42 occurs to a degree to maintain the vertex of fold 54 at a fixed radial position. That is, at radius $R_3$, the acting area $A_3$ of the diaphragm when the piston is urged outwardly of cylinder assembly is equal to the acting area $A_3'$ of the diaphragm at radius $R_3'$ when the piston returns inwardly to the cylinder assembly. Accordingly, the acting area of the piston remains the same, and is given by $A_3 = A_3' = \pi R_3^2 = \pi(R_3')^2$. Therefore, output response of each hydraulic load totalizer cell is linear since a linear increase of pressure in the pressure receiving chamber 56 produces a linear increase of force on piston 36.

This aspect of the present invention providing linear output response may be incorporated in any hydraulic weighing device which has a cylinder, a rolling diaphragm, and a piston abutting the rolling diaphragm.

Thus, the weighing apparatus of the present invention is easily calibrated and has linear output response for a wide range of pressures and, hence, weights being measured.

Although a specific embodiment of this weighing apparatus has been disclosed above in detail, it is to be understood that this is only for purposes of illustration. Modifications may be made to the described structure by those skilled in the art in order to adapt this weighing apparatus to particular applications.

What is claimed is:
1. A weighing apparatus including at least one hydraulic load cell comprising:
    A. a piston member,
    B. cooperating cylinder means having an inner cylindrical wall for receiving said piston member in freely interfittable, relatively reciprocally movable relation, and
    C. a flexible diaphragm of fluid impervious material sealed in said cylinder means and overlying said piston member to form a fluid pressure receiving chamber therebetween, an annular fold of said diaphragm interlying a portion of the free space between said cylindrical wall and said piston member, said cylinder means having an undercut portion underlying the inner cylindrical wall to permit the inner cylindrical wall to flex in the radial direction in response to fluid pressure received in said pressure receiving chamber and said annular diaphragm fold to maintain the acting area of said diaphragm at a substantially uniform value independently of the relative position of said piston member and cylinder means.

2. A weighing apparatus as claimed in claim 1 having a plurality of hydraulic load cells and further comprising:
    A. frame means for interconnecting said plurality of cylinder means in spaced coaxial relation;
    B. means for interconnecting said plurality of piston members in spaced coaxial relation and permitting free reciprocal movement relative to said plurality of cylinder means and said frame means;
    C. force sensitive output signal generating means mounted in said frame means in operative relation to said interconnected piston members for receiving force therefrom when fluid pressure is received in any of said pressure receiving chambers; and
    D. means for adjustably varying the axial location of each piston member relative to its cooperating cylinder means whereby the amount of force applied by each of said piston members to said output signal generating means in response to a given fluid pressure received in the respective fluid pressure receiving chamber may be equalized to calibrate said weighing apparatus.

3. The weighing apparatus as claimed in claim 2 wherein said piston member interconnecting means comprises a plurality of threaded rods mounted between said adjacent piston members.

4. The weighing apparatus as claimed in claim 3 wherein said means for adjustably varying the axial location of each piston member comprises at least one clamp nut for each piston member, threaded onto each of said threaded rods to position said piston member thereon and being rotatable to adjustably move said piston member on said rod in a direction substantially parallel to the rod axis.

5. A weighing apparatus for combining the output pressures of a plurality of hydraulic load accepting cells and for producing one output signal that is proportional to the sum of the individual load accepting cell output pressures, said weighing apparatus comprising:
  A. a plurality of hydraulic load totalizer cells, each including
    1. a piston member,
    2. cooperating cylinder means for receiving said piston member in freely interfittable, relatively reciprocally movable relation, and
    3. a flexible diaphragm of fluid impervious material sealed in said cylinder means and overlying said piston member to form a fluid pressure receiving chamber therebetween, an annular fold of said diaphragm interlying a portion of the free space between said cylinder means and said piston member, each of said hydraulic load accepting cells being in fluid communication with one hydraulic totalizer cell pressure receiving chamber,
  B. frame means for interconnecting said plurality of cylinder means in spaced coaxial relation,
  C. means for interconnecting said plurality of piston members in spaced coaxial relation and for permitting free reciprocal movement relative to said plurality of cylinder means and said frame means,
  D. force sensitive output signal generating means mounted in said frame means in operative relation to said interconnected piston members for receiving force therefrom when fluid pressure is received in any of said pressure receiving chamber, and
  E. means for adjustably varying the axial location of each piston member relative to its cooperating cylinder means whereby the amount of force that each piston member applies to said output signal generating means in response to a given pressure received in the respective pressure receiving chamber may be equalized to calibrate said weighing apparatus.

6. The weighing apparatus as claimed in claim 5 wherein said piston member interconnecting means comprises a plurality of threaded rods mounted between adjacent piston members.

7. The weighing apparatus as claimed in claim 6 wherein said means for adjustably varying the distance between adjacent piston members comprises at least one pair of clamp nuts, for each piston member, threaded onto each of said threaded rods to clamp said piston member between said nuts, said nuts being rotatable to adjustably move said piston member on said rod in a direction substantially parallel to the piston member axis.

8. The weighing apparatus as claimed in claim 5 wherein said cylinder means comprises
  A. a pressure block, and
  B. a cylindrical collar member fixed to said pressure block to define a cylinder open at one end for receiving said piston member, said flexible diaphragm being sealed between said pressure block and collar member, said collar member having an undercut portion underlying the inner cylindrical surface thereof to permit the inner cylindrical wall of said collar member to flex in the radial direction in response to fluid pressure receiving chamber and said diaphragm annular fold to maintain the acting area of said diaphragm at a substantially uniform value independently of the relative position of said piston member and cylinder means.

9. A weighing apparatus for combining output pressures of a plurality of hydraulic load accepting cells and for producing one output signal that is proportional to the sum of the individual load accepting cell output pressures, said weighing apparatus comprising:
  A. a plurality of hydraulic totalizer cells, each including
    1. a piston member,
    2. cooperating cylinder means including
      a. a pressure block, and
      b. a cylindrical collar member fixed to said pressure block to define a cylinder open at one end for receiving said piston member in freely interfittable, relatively reciprocally movable relation,
    3. a flexible diaphragm of fluid impervious material sealed between said pressure block and collar member and overlying said piston member to form a fluid pressure receiving chamber therebetween, an annular fold of said diaphragm interlying a portion of the free space between said collar member and said piston member, said collar member having an undercut portion underlying the inner cylindrical surface thereof to permit the inner cylindrical wall of said collar member to flex in the radial direction in response to fluid pressure received in said pressure receiving chamber and said diaphragm annular fold to maintain the acting area of said diaphragm at a substantially uniform value independently of the relative position of said piston member and cylinder means, each of said hydraulic load accepting cells being in fluid communication with one hydraulic totalizer cell pressure receiving chamber,
  B. frame means for interconnecting said plurality of cylinder means in spaced coaxial relation,
  C. means for interconnecting said plurality of piston members in spaced coaxial relation and for permitting free reciprocal movement relative to said plurality of cylinder means and said frame means,
  D. force sensitive output signal generating means mounted in said frame means in operative relation to said interconnected piston members for receiving forces therefrom when fluid pressure is received in any of said pressure receiving chambers, and
  E. means for adjustably varying the axial location of each piston member relative to its cooperating cylinder means whereby the amount of force applied to said output signal generating means by each piston member in response to a given fluid pressure received in the respective pressure receiving chamber may be equalized to calibrate said weighing apparatus.

10. In a hydraulic load measuring device for combining the output pressures of a plurality of hydraulic load accepting cells for producing one output signal that is proportional to the sum of the individual load accepting cell output pressures, and having a plurality of vertically arranged hydraulic totalizer load cells each including a cylinder, a cooperating piston reciprocally carried in each cylinder and a diaphragm enclosing each cylinder and overlying the associated piston to define a variable volume fluid pressure receiving chamber therebetween, a frame interconnecting and mounting said cylinders in vertically spaced relation, and force sensitive output signal generating means mounted in said frame; an apparatus for calibrating said hydraulic load totalizer to have the same output for the same input to each individual hydraulic load accepting cell, said calibrating apparatus comprising:

A. means for interconnecting the plurality of pistons in spaced vertical relation with one of the pistons in operative relation to the force sensitive output signal generating means for applying pressure thereto when fluid pressure is received in any of the hydraulic totalizer cell pressure receiving chambers, and B. means for adjustably varying the axial location of each piston relative to its cooperating cylinder whereby the amount of force applied to the output signal generating means by each piston in response to a given fluid pressure received in the respective hydraulic totalizer cell pressure receiving chamber may be equalized to calibrate said load measuring device.

* * * * *